(12) United States Patent
Hisamatsu et al.

(10) Patent No.: US 11,140,225 B2
(45) Date of Patent: Oct. 5, 2021

(54) INFORMATION PROCESSING APPARATUS

(71) Applicant: SONY COMPUTER ENTERTAINMENT INC., Tokyo (JP)

(72) Inventors: Fumiaki Hisamatsu, Tokyo (JP); Yuji Nakamura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 420 days.

(21) Appl. No.: 14/913,768

(22) PCT Filed: Mar. 17, 2014

(86) PCT No.: PCT/JP2014/001514
§ 371 (c)(1),
(2) Date: Feb. 23, 2016

(87) PCT Pub. No.: WO2015/040770
PCT Pub. Date: Mar. 26, 2015

(65) Prior Publication Data
US 2016/0205192 A1 Jul. 14, 2016

(30) Foreign Application Priority Data
Sep. 17, 2013 (JP) .............. JP2013-191979

(51) Int. Cl.
*H04L 29/08* (2006.01)
*A63F 13/79* (2014.01)
(Continued)

(52) U.S. Cl.
CPC ............ *H04L 67/12* (2013.01); *A63F 13/235* (2014.09); *A63F 13/327* (2014.09);
(Continued)

(58) Field of Classification Search
CPC .......... G06Q 30/0255; G06Q 30/0601; G06Q 20/384; G06Q 50/01; H04L 51/04;
(Continued)

(56) References Cited

U.S. PATENT DOCUMENTS 7,558,820 B2   7/2009  Kimoto et al.
7,938,727 B1*  5/2011  Konkle ................. A63F 13/332
                                                        463/42

(Continued)

FOREIGN PATENT DOCUMENTS

JP   2008-113782 A   5/2008
JP   2012-178747 A   9/2012
JP   2013-174853 A   9/2013

OTHER PUBLICATIONS

International Search Report dated Jun. 17, 2014, from the corresponding PCT/JP2014/001514.
(Continued)

*Primary Examiner* — Barbara B Anyan
(74) *Attorney, Agent, or Firm* — Katten Muchin Rosenman LLP

(57) ABSTRACT

An acquisition processing section 120 acquires recorded data about a past application session from a log server. A user screen generating block 140 generates a screen related to the application session on the basis of the acquired recorded data. Specifically, a session list displaying section 142 displays information related to a plurality of past application sessions. A user list displaying section 144 displays information identifying the users having participated in one past application session.

6 Claims, 11 Drawing Sheets

(51) Int. Cl.
| | |
|---|---|
| *A63F 13/332* | (2014.01) |
| *G06Q 50/10* | (2012.01) |
| *A63F 13/60* | (2014.01) |
| *A63F 13/327* | (2014.01) |
| *A63F 13/235* | (2014.01) |
| *G07F 17/32* | (2006.01) |
| *G06F 13/00* | (2006.01) |
| *G06Q 30/02* | (2012.01) |
| *G06Q 30/08* | (2012.01) |
| *G06F 3/14* | (2006.01) |
| *G06F 3/0481* | (2013.01) |
| *G06F 13/38* | (2006.01) |

(52) U.S. Cl.
CPC ............ *A63F 13/332* (2014.09); *A63F 13/60* (2014.09); *A63F 13/79* (2014.09); *G06F 3/0481* (2013.01); *G06F 3/14* (2013.01); *G06F 13/00* (2013.01); *G06F 13/385* (2013.01); *G06Q 50/10* (2013.01); *H04L 67/22* (2013.01); *G06Q 30/0212* (2013.01); *G06Q 30/08* (2013.01); *G07F 17/3286* (2013.01); *G07F 17/3293* (2013.01)

(58) Field of Classification Search
CPC ..... H04L 67/22; H04L 67/10; H04L 12/1822; Y10S 707/99943; G06F 15/0225; G06F 17/30873; G06F 17/30876; G06F 17/30994; G06F 2216/15; A63F 2300/556; A63F 13/12; A63F 13/335; A63F 13/352
See application file for complete search history.

(56) References Cited

U.S. PATENT DOCUMENTS

| | | | | |
|---|---|---|---|---|
| 8,360,873 | B1* | 1/2013 | Wickett | A63F 13/79 463/29 |
| 2002/0130904 | A1* | 9/2002 | Becker | H04L 51/04 715/753 |
| 2003/0032476 | A1* | 2/2003 | Walker | G06Q 30/0212 463/25 |
| 2003/0154398 | A1* | 8/2003 | Eaton | G06Q 30/08 709/227 |
| 2004/0078448 | A1* | 4/2004 | Malik | H04L 51/04 709/206 |
| 2006/0148549 | A1* | 7/2006 | Walker | G07F 17/323 463/16 |
| 2007/0218997 | A1* | 9/2007 | Cho | A63F 13/795 463/42 |
| 2008/0051171 | A1* | 2/2008 | Lutnick | G07F 17/3272 463/20 |
| 2008/0191418 | A1* | 8/2008 | Lutnick | A63F 1/00 273/303 |
| 2008/0214286 | A1* | 9/2008 | Lutnick | G07F 17/3293 463/25 |
| 2010/0048302 | A1* | 2/2010 | Lutnick | G07F 17/3286 463/42 |
| 2010/0113160 | A1* | 5/2010 | Belz | A63F 13/92 463/42 |
| 2010/0160038 | A1* | 6/2010 | Youm | A63F 13/497 463/29 |
| 2010/0227688 | A1* | 9/2010 | Lee | A63F 13/60 463/31 |
| 2010/0227691 | A1* | 9/2010 | Karsten | G07F 17/3239 463/42 |
| 2012/0011140 | A1* | 1/2012 | Chakra | G06Q 10/107 707/769 |
| 2012/0021823 | A1* | 1/2012 | Youm | A63F 13/497 463/29 |
| 2012/0028713 | A1* | 2/2012 | Driemeyer | A63F 13/60 463/42 |
| 2012/0094757 | A1* | 4/2012 | Vago | A63F 13/327 463/31 |
| 2012/0122552 | A1* | 5/2012 | Youm | A63F 13/497 463/23 |
| 2012/0220230 | A1 | 8/2012 | Kurata et al. | |
| 2012/0309524 | A1* | 12/2012 | Rajaraman | G07F 17/3227 463/31 |
| 2013/0005476 | A1* | 1/2013 | Keswani | A63F 13/235 463/42 |
| 2013/0196761 | A1* | 8/2013 | Doorgeest | A63F 13/12 463/31 |
| 2013/0326370 | A1 | 12/2013 | Nogami et al. | |
| 2015/0202532 | A1* | 7/2015 | Takeuchi | A63F 13/79 463/42 |

OTHER PUBLICATIONS

International Preliminary Report on Patentability and Written Opinion of the International Searching Authority dated Mar. 31, 2016 from corresponding International Application No. PCT/JP2014/001514.

Office Action dated Dec. 20, 2016, from the corresponding Japanese Application No. 2013-191979.

* cited by examiner

FIG. 2
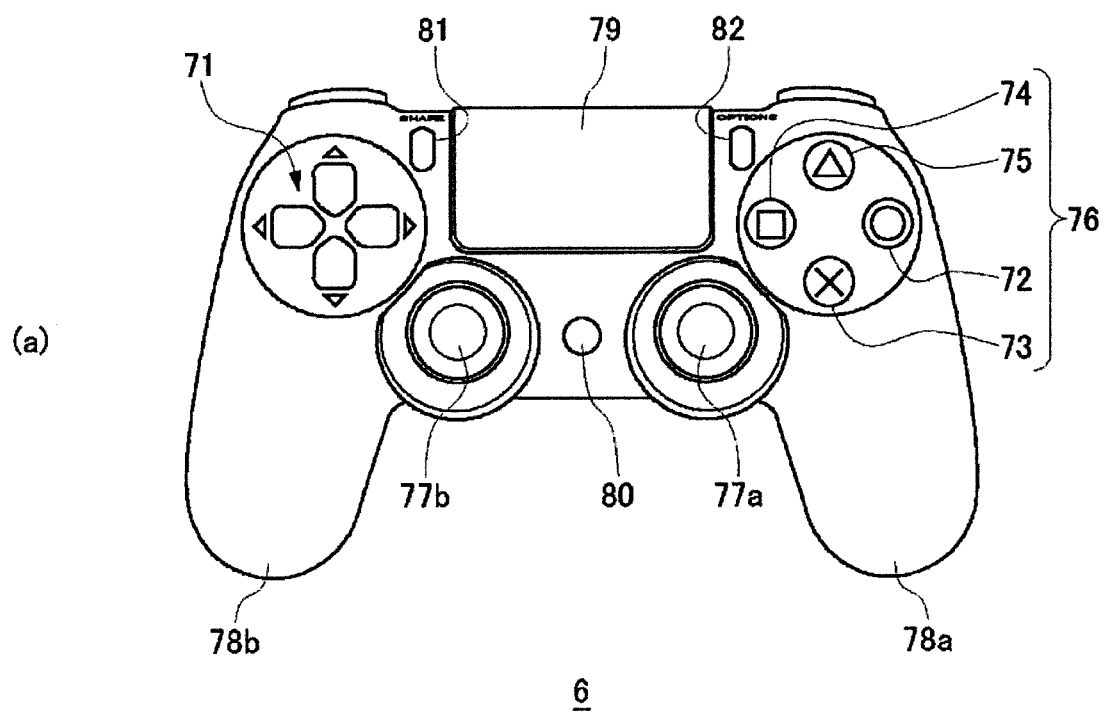
(a)
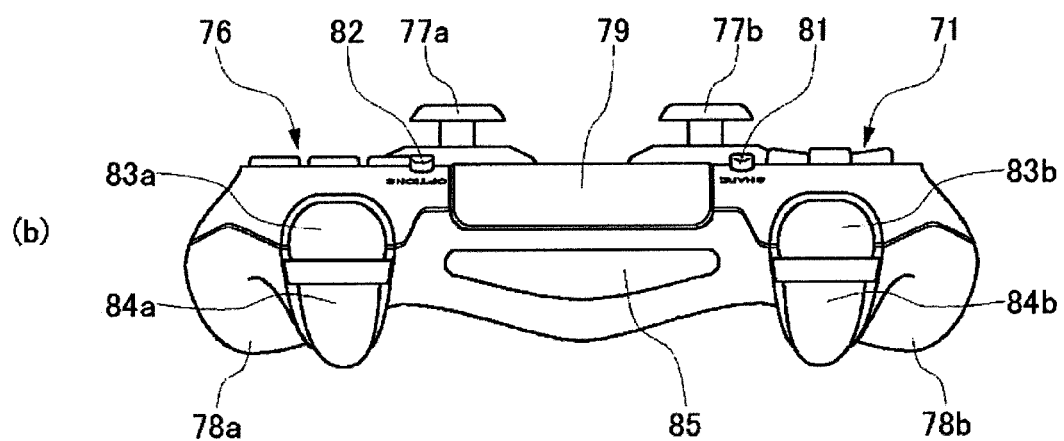
(b)

INFORMATION PROCESSING APPARATUS

TECHNICAL FIELD

The present invention relates to an information processing apparatus such as a game machine.

BACKGROUND ART

Recent years have witnessed the advent of a substantially improved network environment that enables exchanges of diverse kinds of information data between information processing apparatuses operated by users. In such an environment, any user may participate in a multiplayer online game and enjoy it with other users.

CITATION LIST

Patent Literature

[PTL 1]
U.S. Pat. No. 7,558,820

SUMMARY

Technical Problem

Numerous users from all over the world participate in multiplayer online games. This allows each user to have the opportunity of playing games not only with users registered as friends on a server of the game system but also with users encountered in the game for the first time. A game session is generated on an ad-hoc basis for the game. Once the game session ends, the users who participated in the game often stay out of touch with one another, unless they exchange their online IDs between them, for example. It has thus been desired to have an environment that will allow the user, after each game session, to easily access information related to past game sessions.

It is therefore an object of the present invention to provide a scheme in which a user is efficiently presented with information related to application sessions such as those of games.

Solution to Problem

In solving the above problem and according to one embodiment of the present invention, there is provided an information processing apparatus including an acquisition processing section that acquires recorded data about a past application session, and a screen generating unit that generates a screen related to the application session on the basis of the acquired recorded data. The screen generating unit includes a displaying section that displays information related to a plurality of past application sessions. In displaying the information about the past application sessions, the displaying section displays detailed information about an application session about which the information is selected by a user from among the application sessions.

Incidentally, if other combinations of the above-outlined composing elements or the above expressions of the present invention are converted between different forms such as a method, a device, a system, a recording medium, and a computer program, they still constitute effective embodiments of this invention.

BRIEF DESCRIPTION OF DRAWINGS

FIG. 2(a) is a schematic diagram showing an external configuration of the top of an input device, and FIG. 2(b) is a schematic view showing an external configuration of the rear side of the input device.

DESCRIPTION OF EMBODIMENTS

Figure 1:
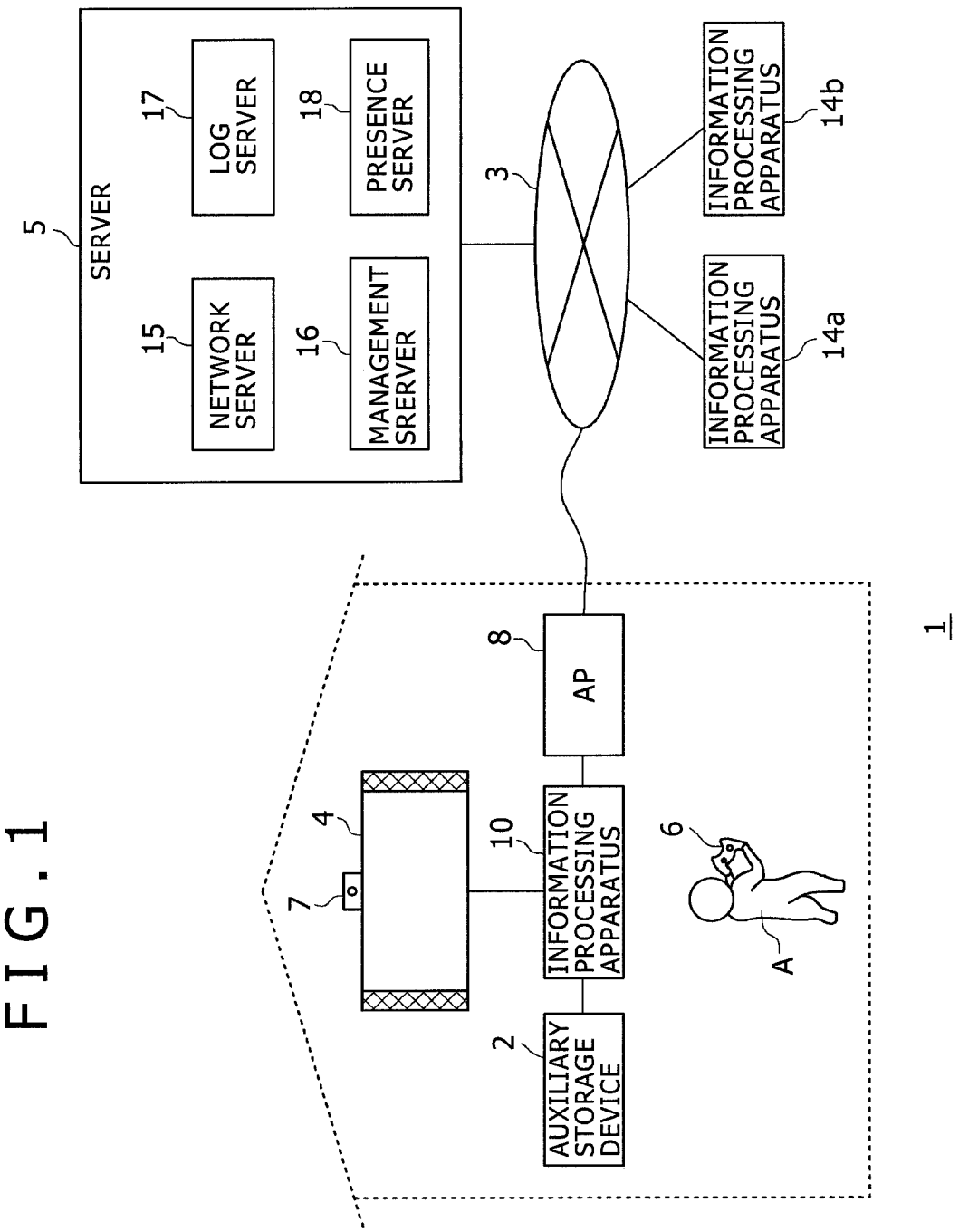
FIG. 1 is a schematic diagram showing an information processing system in one embodiment of the present invention.

FIG. 1 shows an information processing system 1 practiced as one embodiment of the present invention. The information processing system 1 has an information processing apparatus 10 that is a user terminal, and information processing apparatuses 14a and 14b (referred to as the information processing apparatus 14 where no distinction is made therebetween), and a server 5. In this embodiment, the information processing apparatuses 10 and 14 have the same configuration and the same functionality, but are operated by different users.

An auxiliary storage device 2 is a mass storage device such as an HDD (hard disk drive) or a flash memory. This device may be an external storage device connected with the information processing apparatus 10 through a USB (Universal Serial Bus). Alternatively, this device may be a built-in storage device. An output device 4 may be a television set having a display for outputting images and speakers for outputting audio, or may be a computer display. The output device 4 may be connected to the information processing apparatus 10 in a wired (with cable) or a wireless manner. The information processing apparatus 10 is connected in wired or wireless fashion to an input device 6 operated by a user. The input device 6 outputs to the information processing apparatus 10 operation signals indicative of the results of user operations. Upon receipt of the operation signals from the input device 6, the information processing apparatus 10 allows the signals to be reflected on the processing performed by the OS (system software) and by applications and causes the output device 4 to output processing results. The input device 6 is configured to have multiple input sections such as multiple pushbuttons, an analog stick for entering analog quantities, and a rotary button.

In the information processing system 1, the information processing apparatus 10 is a game machine for executing games. The input device 6 is a device that provides user operation signal to the information processing apparatus 10 such as a game controller. The input device 6 may also be an input interface such as a keyboard or a mouse. A camera 7 acting as an imaging device is installed near the output device 4 to obtain images of the space around the output device 4. Whereas FIG. 1 shows an example in which the camera 7 is mounted on top of the output device 4, the camera 7 may be located alternatively on one side of the output device 4. In any case, the camera 7 is located in such a manner that an image of the user playing games in front of the output device 4 will be obtained.

An access point (hereinafter referred to as "AP") 8 has the functions of a wireless access point and a router. The information processing apparatuses 10 and 14 are connected to the AP 8 in wired or wireless fashion, thereby being communicably connected to the server 5 on a network 3.

As described above, the information processing apparatus 14, which has the same configuration and the same functionality as the information processing apparatus 10, is operated by a user different from the user of the information processing apparatus 10. Although not shown, the information processing apparatus 14 is connected to the output device 4 and auxiliary storage device 2 and receives the operation signals input from the input device 6. Also, the information processing apparatus 14 may exchange information data with the information processing apparatus 10 when connected via an access point to the network 3, with or without the intervention of the server 5.

The server 5 offers a network service to the user of the information processing system 1. The server 5 may be physically composed of a plurality of servers. Each of the servers may be managed and maintained by an entity corresponding to its function. In this example, the server 5 is configured to include a network server 15, a management server 16, a log server 17, and a presence server 18. The network server 15, management server 16, log server 17, and presence server 18 may each be configured by a plurality of servers. There may also be provided a server that functionally integrates two or more of these servers.

The network server 15 manages network accounts that identify the users using the information processing system 1. By use of his/her network account, the user signs in to the network service offered by the network server 15. Signing in to the network service through the information processing apparatus 10 allows the user to save data from games and to register trophies, which are virtual prizes obtained by the user while playing games. The network server 15 manages the network accounts of registered friends for each user.

The management server 16 offers diverse service functions to the users. Specifically, the management server 16 provides an invitation function that enables a user to invite another user while playing a game; a message function for exchanging messages between users; and a session function that manages game sessions, for example. The management server 16 may also be set up to provide each of these service functions. For example, an invitation server, a message server, and a session server may be set up independently of each other to perform their respective functions.

In the information processing system 1, the information processing apparatuses 10 and 14 may execute an application in which a plurality of users may participate (i.e., multiplayer online application). The management server 16 generates a session of the multiplayer online application (simply called the "application" hereunder where appropriate). A plurality of users may participate in the session to enjoy a single application together.

A typical session is generated as follows: By using the information processing apparatus 10, user A prepares an instruction to generate a session of a multiplayer online application. This application is typified by, but not limited to, chat and games. At this point, the user A also prepares a title for identifying the session (session name). The information processing apparatus 10 transmits the session generating instruction and the session name to the management server 16. In turn, the management server 16 generates an application session. Specifically, the management server 16 issues identification information identifying the session (called the "session ID" hereunder) and returns the issued information to the information processing apparatus 10. The session ID may be a URI (Universal Resource Identifier) enabling another information processing apparatus 14, which will also participate in the session, to connect to and communicate synchronously with the management server 16. The URI may alternatively designate a server (application server) different from the session server. Whereas it was explained above that the application session is generated as requested by the user A, the application session may also be generated upon request by another user.

Described above was the example in which a user causes an application session to be intentionally generated. In another example, the management server 16 may on its own initiative generate an application session in which the users of the information processing apparatuses 10 and 14 may participate. Each of the information processing apparatuses 10 and 14 operated by the users participating in the session may acquire operation information about the other user via the management server 16. Alternatively, the information processing apparatuses 10 and 14 of the participating users may exchange their operation information directly between them.

The log server 17 records various data about application sessions. In the ensuing description, the data recorded by the log server 17 will be referred to as the "recorded data." The recorded data includes an ID identifying each application session, a session name for the application, and information identifying the users having participated in the session. From the information processing apparatuses 10 and 14 of the users participating in the application session, the log server 17 acquires information data such as the information identifying the users, the application name, the ID of the session being participated in, and the session name. The log server 17 retains the recorded data thus acquired in association with the same session ID. Alternatively, the log server 17 may acquire the information data related to a given application session from the management server 16 managing that application session. As another alternative, the management server 16 may assume the function of the log server 17 to record the data related to past application sessions.

The presence server 18 manages presence information transmitted from the information processing apparatuses 10 and 14. In this context, the presence information refers at least to information indicating that the information processing apparatuses 10 and 14 are currently online and to information about the currently executing application (game). Besides transmitting its own presence information to the presence server 18, the information processing apparatus 10 may also acquire the presence information about the information processing apparatus 14 operated by the other user registered as a friend on the network server 15.

FIG. 2(a) shows an external configuration of the top of the input device. A user holds a left-side grip 78b by the left hand and a right-side grip 78a by the right hand, thereby operating the input device 6. On a top housing surface of the input device 6 are the input sections made up of direction keys 71, analog sticks 77a and 77b, and four types of operation buttons 76. The four types of buttons 72 through 75 are marked with different symbols in different colors for distinction from each other. That is, the circle button 72 is marked with a red circle, the X button 73 with a blue X, the square button 74 with a violet square, and the triangle button 75 with a green triangle. On the top housing surface, a touch pad 79 is provided in a flat area between the direction keys 71 on the one hand and the operation buttons 76 on the other hand. The touch pad 79 also functions as a depression button, which is depressed when pressed by the user and returns to its initial position when released.

A function button 80 is provided between the two analog sticks 77a and 77b. The function button 80 is used to turn on power to the input device 6 and to activate simultaneously its communication function for connecting with the input processing apparatus 10. If the main power to the information processing apparatus 10 is off, pressing the function button 80 causes the information processing apparatus 10 to receive a connection request from the input device 6 as an instruction to turn on the main power, the request thereupon turning on the main power of the information processing apparatus 10. After the input device 6 is connected to the information processing apparatus 10, the function button 80 is also used to display a menu screen on the information processing apparatus 10.

A SHARE button 81 is provided between the touch pad 79 and the direction keys 71. The SHARE button 81 is used to enter the user's instructions into the OS or the system software of the information processing apparatus 10. An OPTION button 82 is further provided between the touch pad 79 and the operation buttons 76. The OPTION button 82 is used to enter the user's instructions into an application (game) that is executed on the information processing apparatus 10. The SHARE button 81 and the OPTION button 82 may each be formed as a pushbutton.

FIG. 2(b) shows an external configuration of the rear side of the input device 6. At the top of the housing rear side of the input device 6 is the touch pad 79 extending from the housing top. At the bottom of the housing rear is a horizontally elongated light-emitting section 85. The light-emitting section 85 has red (R), green (G), and blue (B) light-emitting diodes (LEDs) that are turned on in accordance with luminescent color information transmitted from the information processing apparatus 10. A plurality of input devices 6, if connected to a single information processing apparatus 10, will have their light-emitting sections 85 emit light in different colors. The illumination in different colors of the light-emitting sections 85 allows each user to recognize his/her input device 6, which reduces the possibility of any user using a wrong input device 6.

On the housing rear side, an upper button 83a and a lower button 84a on the left side and an upper button 83b and a lower button 84b on the right side are positioned symmetrically in a longitudinal direction. The upper button 83a and the lower button 84a are operated by the index finger and the middle finger, respectively, of the user's right hand; the upper button 83b and the lower button 84b are operated by the index finger and the middle finger, respectively, of the user's left hand. As shown, the light-emitting section 85, located between the row of the right-side upper button 83a and lower button 84a and the row of the left-side upper button 83b and lower-button 84b, is not hidden by the index and middle fingers operating the buttons. This allows the camera 7 to take a suitable image of the light-emitting section 85 being lighted. The upper buttons 83 may be formed as pushbuttons, and the lower-buttons 84 may be provided as rotatably supported trigger buttons.

Figure 3:
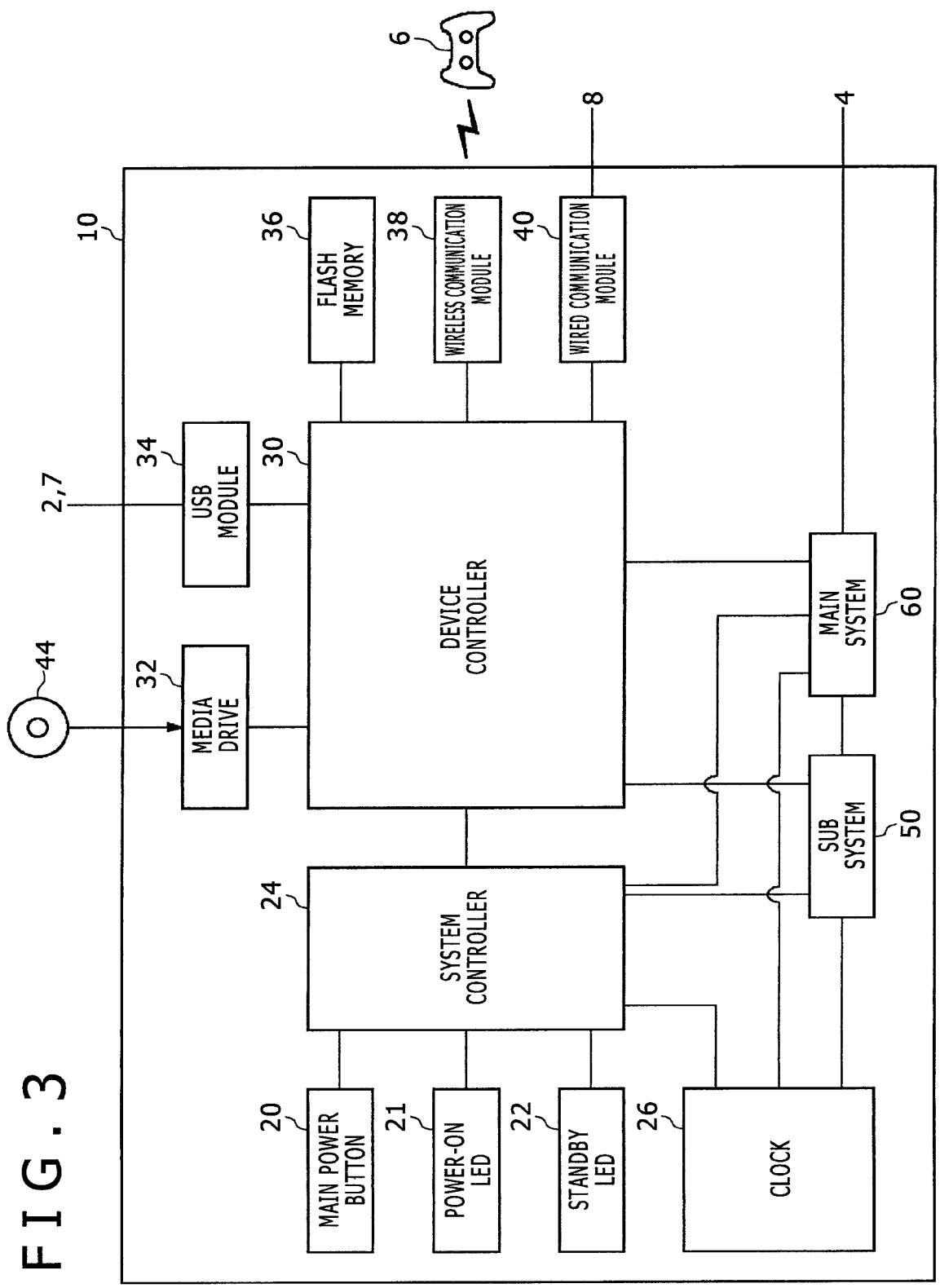
FIG. 3 is a schematic diagram showing functional blocks of an information processing apparatus.

FIG. 3 is a functional block diagram of the information processing apparatus 10. The information processing apparatus 10 is configured to have a main power button 20, a power-on LED 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 has a CPU (central processing unit), a memory acting as a main storage device, a memory controller, and a GPU (graphics processing unit). The GPU is used primarily for arithmetic processing of game programs. These functions may be implemented by a single chip in the form of a system-on-a-chip. The main CPU has the function of starting up the OS and executing applications installed in the auxiliary storage device 2 in the environment provided by the OS.

The sub system 50 has a sub CPU, a memory acting as a main storage device, and a memory controller. The sub system 50 does not have the GPU. The circuit gates in the sub CPU are fewer than the circuit gates in the main CPU, and the sub CPU consumes less operating power than the main CPU. As mentioned above, the sub CPU operates when the main CPU is in the standby state. Thus the sub CPU has its processing functions limited so as to reduce power consumption. Alternatively, the sub CPU and the memory may be formed on a separate chip.

The main power button 20, which is an input section operated by the user, is provided on the housing front of the information processing apparatus 10. The main power button 20 is operated to turn on or off the supply of power to the main system 60 of the information processing apparatus 10. In the ensuing description, the wording the main power is in the on-state means that the main system 60 is in an active state, and the wording the main power is in the off-state means that the main system 60 is in the standby state. A power-on LED 21 glows when the main power button 20 is switched on. A standby LED 22 glows when the main power button 20 is switched off.

The system controller 24 detects the pressing of the main power button 20 by the user. When the main power button 20 is pressed with the main power being off, the system controller 24 acquires the pressing operation as an "on-instruction"; when the main power button 20 is pressed with the main power being on, the system controller 24 acquires this pressing operation as an "off-instruction."

The main CPU has the function of executing a game program installed in the auxiliary storage device 2 or on a ROM medium 44. The sub CPU does not have such a function. However, the sub CPU has the function of accessing the auxiliary storage device 2 as well as the function of transmitting and receiving data to and from the server 5. The sub CPU is configured to have only such limited processing functions, which enables the sub CPU to operate on less power than the main CPU. The functions of the sub CPU are performed when the main CPU is in the standby state. With the sub system 50 operating while the main system 60 is in the standby state, the information processing apparatus 10 of this embodiment stays signed in to the network service offered by the network server 15.

The clock 26, which is a real-time clock, generates current date and time information and supplies the generated information to the system controller 24, sub system 50, and main system 60.

The device controller 30 is configured as an LSI (Large-Scale Integrated Circuit) such as a southbridge that executes exchanges of information between devices. As shown, the device controller 30 is connected with devices such as the system controller 24, media drive 32, USB module 34, flash memory 36, wireless communication module 38, wired communication module 40, sub system 50, and main system 60. The device controller 30 absorbs differences in electric characteristics and transfer speeds between devices, thereby controlling the timing of data transfers.

The media drive 32 is a drive device that drives a loaded ROM medium 44 on which application software such as games and licensed information are recorded, to read programs and data from the loaded ROM medium 44. The ROM medium 44 is a read-only recording medium such as an optical disk, a magneto-optical disk, or a Blu-ray disk.

The USB module 34 is a module that is connected to external devices via USB cables. For example, the USB module 34 may be connected to the auxiliary storage apparatus 2 and the camera 7 via a USB cable. The flash memory 36 is an auxiliary storage device that provides internal storage. The wireless communication module 38 communicates wirelessly with the input device 6, for example, under communication protocol such as Bluetooth (registered trademark) or IEEE 802.11. The wireless communication module 38 may comply with the third-generation digital mobile phone system based on the IMT-2000 (International Mobile Telecommunication 2000) standard stipulated by the ITU (International Telecommunication Union). The wireless communication module 38 may further comply with another generation digital mobile phone system. The wired communication module 40 communicates with external devices in a wired manner and is connected to the network 3 via the AP 8 for example.

Figure 4:
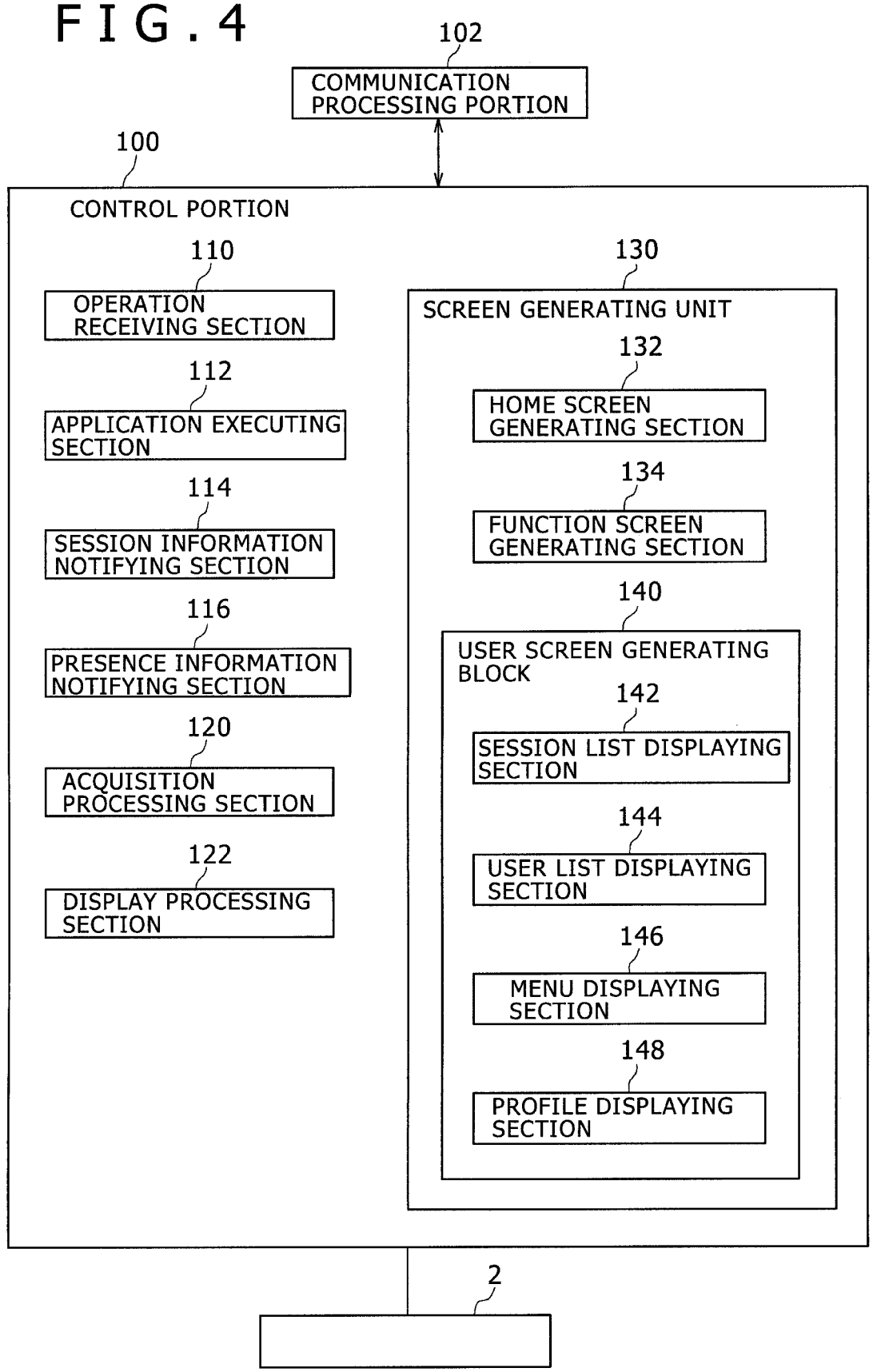
FIG. 4 is a schematic diagram showing an internal configuration of the information processing apparatus.

FIG. 4 shows an internal configuration of the information processing apparatus 10. The information processing apparatus 10 has a communication processing portion 102 and a control portion 100. The control portion 100 has an operation receiving section 110, an application executing section 112, a session information notifying section 114, a presence information notifying section 116, an acquisition processing section 120, a display processing section 122, and a screen generating unit 130. The screen generating unit 130 has a home screen generating section 132, a function screen generating section 134, and a user screen generating block 140. The user screen generating block 140 has a session list displaying section 142, a user list displaying section 144, a menu displaying section 146, and a profile displaying section 148. The communication processing portion 102 embraces the functions of the wireless communication module 38 and wired communication module 40 shown in FIG. 3.

The elements shown in FIG. 4 as the functional blocks for performing various functions may be constituted by hardware such as circuit blocks, memories, and other large-scale integration (LSI) circuits, or by software such as programs loaded in a memory. It will be understood by those skilled in the art that these functional blocks are implemented in diverse forms by hardware alone, by software alone, or by combinations of both, but are not limited thereby.

The operation receiving section 110 receives an operation signal from the input device 6. The application executing section 112 executes a multiplayer online application. The executed application causes the operation signal received by the operation receiving section 110 to be reflected in the process of the application. At the same time, the application transmits the operation signal to the management server 16.

The acquisition processing section 120 acquires an operation signal of another user from the management server 16. The application also causes the operation signal from the other user to be reflected in the process of the application. In this manner, a plurality of users can enjoy the application together. The session information notifying section 114 notifies the log server 17 of session information including a session ID, a session name, an application name, and information identifying the user. The timing of the notification may be when the user participates in the application session, when the application session has ended, or whenever desired subsequently by the user.

As described above, the log server 17 receives the session information from the information processing apparatuses 10 and 14 of the users having participated in the application session, and records the session information in association with the session ID. When the user A is a host user of the application session, the information processing apparatus 10 of the user A may notify the log server 17 of the session information including the session ID, session name, application name, and user identification information identifying all participating users. Alternatively, the information processing apparatus 14 of the user having participated as a guest may notify the log server 17 of the session information including the session ID, session name, application name, and user identification information identifying all participating users. In any case, the log server 17 holds as the recorded data the session ID, session name, application name, and information identifying all users having participated in the session. Where the management server 16 takes the initiative in generating the application session, the log server 17 may acquire the session information from the management server 16. The log server 17 thus acquires and retains the recorded data related to past application sessions.

Explained below are the screens to be displayed on the output device 4 of the information processing apparatus 10.

Figure 5:
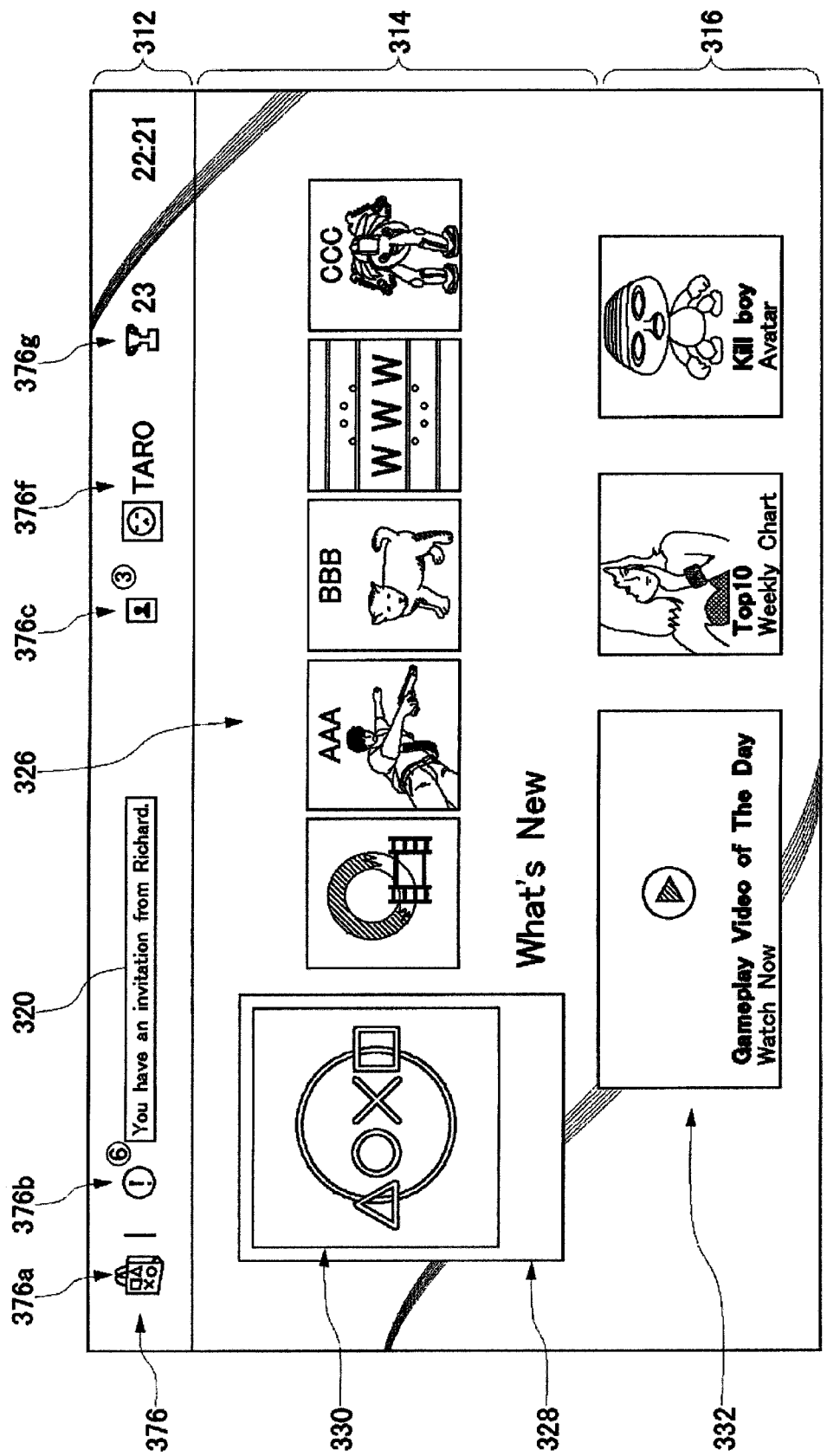
FIG. 5 is a schematic diagram showing a typical home screen.

A login by the user A to the information processing apparatus 10 causes a home screen to be displayed. FIG. 5 shows a typical home screen. The home screen generating section 132 arranges a newly arriving information icon 330 at the head of a row of icons (i.e., at the leftmost position). Upon displaying the home screen for the first time, the home screen generating section 132 puts the newly arriving information icon 330 in a focused state in a content area 314. On the basis of the date and time at which the user accessed each application and each content item, the home screen generating section 132 arranges content icons 326 on the second and subsequent rows in chronological order of the access, most recent first. With the newly arriving information icon 330 placed in the focused state, the home screen generating section 132 arranges live information items 332 in a live area 316.

The home screen generating section 132 further arranges in a system area 312 part of a plurality of system function icons 376 indicative of a plurality of system functions provided by the information processing apparatus 10. Displayed in the example of FIG. 5 are a store icon 376a, a notification icon 376b, a friend icon 376c, a profile icon 376f, and a trophy icon 376g. The home screen generating section 132 arranges in association with the trophy icon 376g a trophy count indicator indicating the number of trophies obtained by the user A ("23" in FIG. 5). The home screen generating section 132 also arranges in association with the notification icon 376b an unread message count indicator indicating the number of messages yet to be read by the user A ("6" in FIG. 5). The home screen generating section 132 further forms near the notification icon 376b a display area 320 for displaying a message addressed to the user A.

The home screen generating section 132 arranges in association with the friend icon 376c an online friend count indicator indicating the number of online friend users, i.e., the number of friends currently logging in to another information processing apparatus 14 ("3" in FIG. 5). A friend user is a user registered as a friend of the user A on the network server 15.

Registering a friend requires the user A to transmit a friend request addressed to a specific user and the addressed user to approve of becoming a friend of the user A. Conversely, the user A may approve a friend request from a particular user to thereby register the requesting user as a friend on the network server 15. The network server 15 thus has friends registered for each user. Basically, the user is always in a state of signing in to the network service. When the user logs in, the information processing apparatus 10 or 14 notifies the network server 15 of the user's login information. The network server 15 thus manages continuously whether each user has logged in to the information processing apparatus.

After the user's login, the presence information notifying section 116 notifies the presence server 18 of presence information. The presence information includes information indicating that the information processing apparatus 10 is currently online as well as information about the currently executing application.

On the home screen shown in FIG. 5, the user may select the friend icon 376c. The selection causes the function screen generating section 134 to generate a function screen regarding friends.

Figure 6:
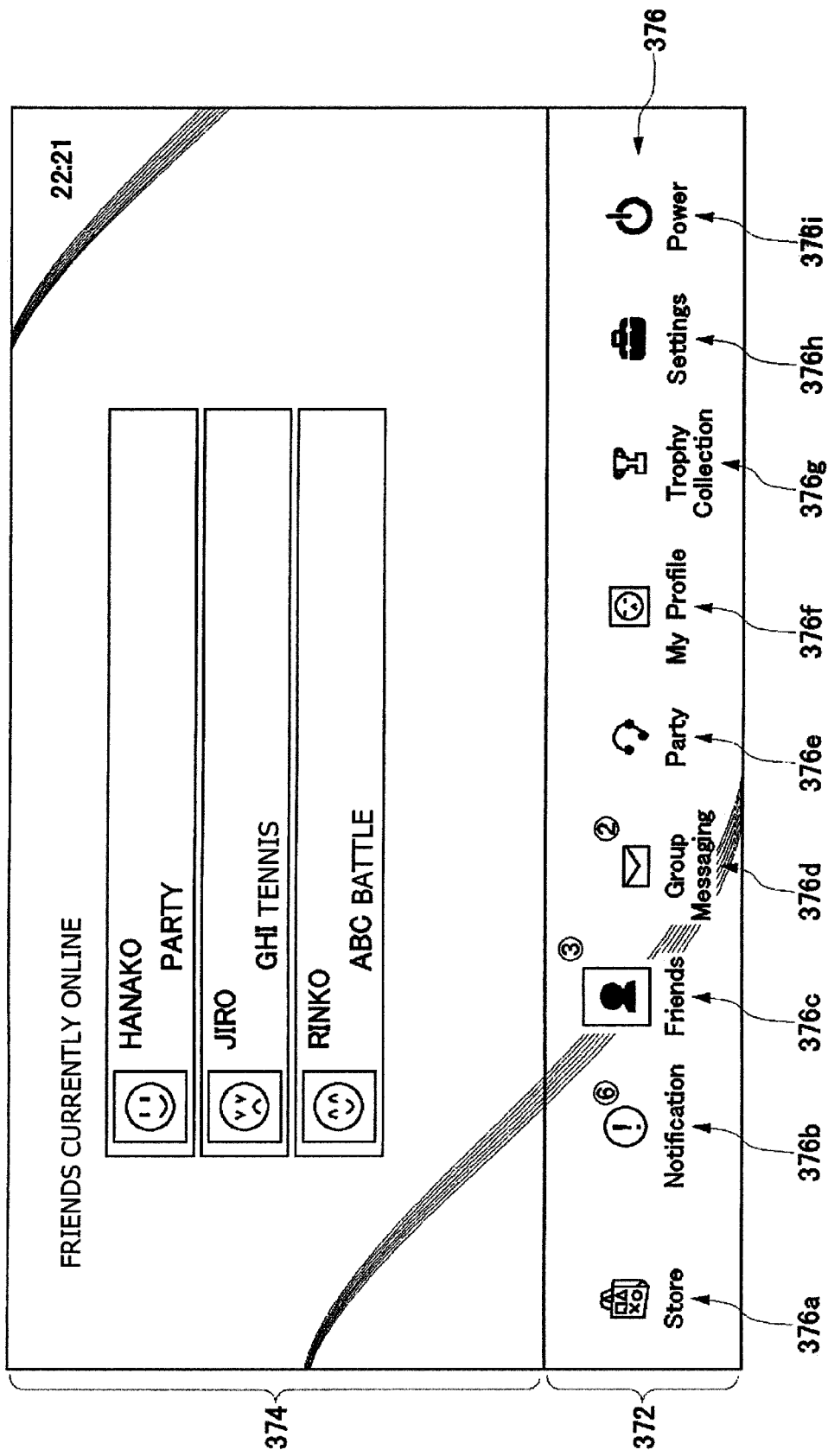
FIG. 6 is a schematic diagram showing a typical function screen having transitioned from the home screen.

FIG. 6 shows a typical function screen having transitioned from the home screen. The user may select the friend icon 376c on the home screen in FIG. 5 and perform an enter operation. The enter operation is received by the operation receiving section 110 and passed on to the function screen generating section 134. In turn, the function screen generating section 134 causes the output device 4 to display the function screen shown in FIG. 6.

The function screen generating section 134 arranges a plurality of system function icons 376 in a system function selection area 372. Displayed here in the system function selection area 372 are a store icon 376a, a notification icon 376b, a friend icon 376c, a group message icon 376d, a party icon 376e, a profile icon 376f, a trophy icon 376g, a setting icon 376h, and a power icon 376i. The display processing section 122 shifts the focus from one system function icon 376 to another every time the user performs a horizontal shift operation on the input device 6 (by operating on the right or left direction key 71). The focused icon is displayed in a highlighted manner (enlarged, in a different color, etc.). In FIG. 6, the friend icon 376c is selectively focused and put in the highlighted state in contrast to the other icons.

A preview area 374 displays the presence information about friends currently online. The acquisition processing section 120 accesses the network server 15 to acquire the information (network accounts) identifying the friends currently online, transmits the acquired information to the presence server 18, and receives the presence information about the friends from the presence server 18. The friends' online IDs (user names) and their icon images are registered on the network server 15. The acquisition processing section 120 acquires the network accounts together with the online IDs and icon images from the network server 15. After acquisition, the function screen generating section 134 displays in the preview area 374 the acquired presence information along with the online IDs and icon images. Alternatively, the online IDs and icon images may be retained on the presence server 18. This allows the acquisition processing section 120 to acquire the online IDs, icon images, and presence information from the presence server 18. The preview area 374 shown in FIG. 6 indicates that HANAKO is participating in a party application, that JIRO is playing a GHI tennis game, and that RINKO is playing an ABC battle game. The party application refers to a chat application in which a plurality of users participate through the information processing system 1.

On the function screen, the user may perform an enter operation on the focused friend icon 376c. The enter operation is received by the operation receiving section 110 and passed on to the user screen generating block 140. In turn, the user screen generating block 140 generates a screen regarding other users (called the friend screen hereunder) and displays the generated screen on the output device 4. In addition to the function of generating the friend screen, the user screen generating block 140 in this embodiment also has the function of generating a screen regarding users not registered as friends. Specifically, the user screen generating block 140 has the function of generating a screen related to past application sessions. This function enables display of the information about the users having participating in past application sessions.

Figure 7:
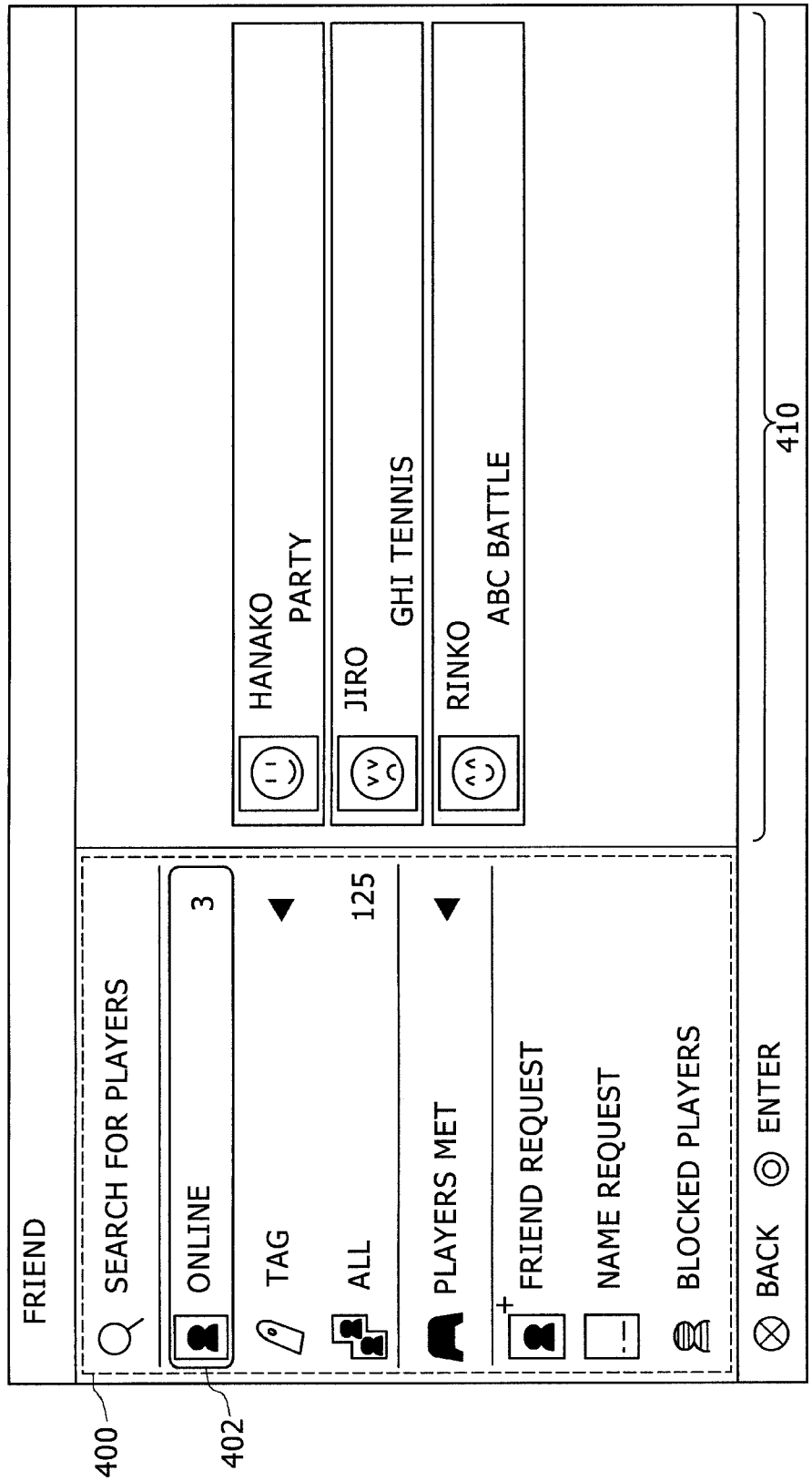
FIG. 7 is a schematic diagram showing a typical friend screen having transitioned from the function screen.

FIG. 7 shows a typical friend screen having transitioned from the function screen. On the function screen shown in FIG. 6, the user may select the friend icon 376c and perform an enter operation. The enter operation is received by the operation receiving section 110 and passed on to the user screen generating block 140. In turn, the user screen generating block 140 causes the output device 4 to display the friend screen shown in FIG. 7.

The user screen generating block 140 divides the display area of the output device 4 into two areas: a menu area 400 for displaying menu items, and a user area 410 for displaying user information related to a selected menu item. The menu displaying section 146 displays in the menu area 400 the menu items set on the friend screen. The display processing section 122 arranges a focus frame 402 in a manner enclosing one of the menu items. The display processing section 122 shifts the focus frame 402 from one item to another every time the user performs a vertical shift operation on the input device 6 (by operating on the upward or downward direction key 71). On the friend screen shown in FIG. 7, the focus frame 402 is placed around an item "Online." The user list displaying section 144 displays in the user area 410 the user information related to the item "Online."

In the menu area 400, the item "Online" is intended for displaying the friends currently online from among the user A's friends. As shown in FIG. 6, the user list displaying section 144 displays the presence information about three friends in the user area 410. Specifically, with the focus frame 402 placed around the item "Online," the acquisition processing section 120 accesses the network server 15 to acquire the information identifying the friends currently online together with the corresponding online IDs and icon images. The acquisition processing section 120 transmits the acquired information identifying the friends to the presence server 18 and receives in return the presence information about the friends from the presence server 18. This is how the user list displaying section 144 displays the presence information about the friends currently online in the user area 410.

In the menu area 400, an item "All" is intended for displaying all friends of the user A. The item here indicates that 125 friends are registered. With the focus frame 402 placed around the item "All," the acquisition processing section 120 accesses the network server 15 to acquire the online IDs and icon images of all friends, and accesses the presence server 18 to acquire the presence information about the friends currently online. The user list displaying section 144 thus displays the information about the friends in the user area 410. The user area 410 can accommodate information about only up to a predetermined number of friends. The information about friends exceeding the predetermined number is verified by the user A scrolling the information about the friends across the user area 410.

In the menu area 400, an item "Players Met" is intended for displaying the players with whom the user A played games together in past application sessions. With the focus frame 402 placed around the item "Players Met," the acquisition processing section 120 accesses the log server 17 to acquire the information related to the application sessions from among the recorded data about the application sessions in which the user A participated.

At this moment, the log server 17 calculates for each application session the difference in time between the time at which the application session ended and the current time, and transmits the calculated time differences to the information processing apparatus 10. This allows the acquisition processing section 120 to acquire from the log server 17 at least the session IDs, application names, the number of users who participated in each session, and the time difference of each session from the current time.

Figure 8:
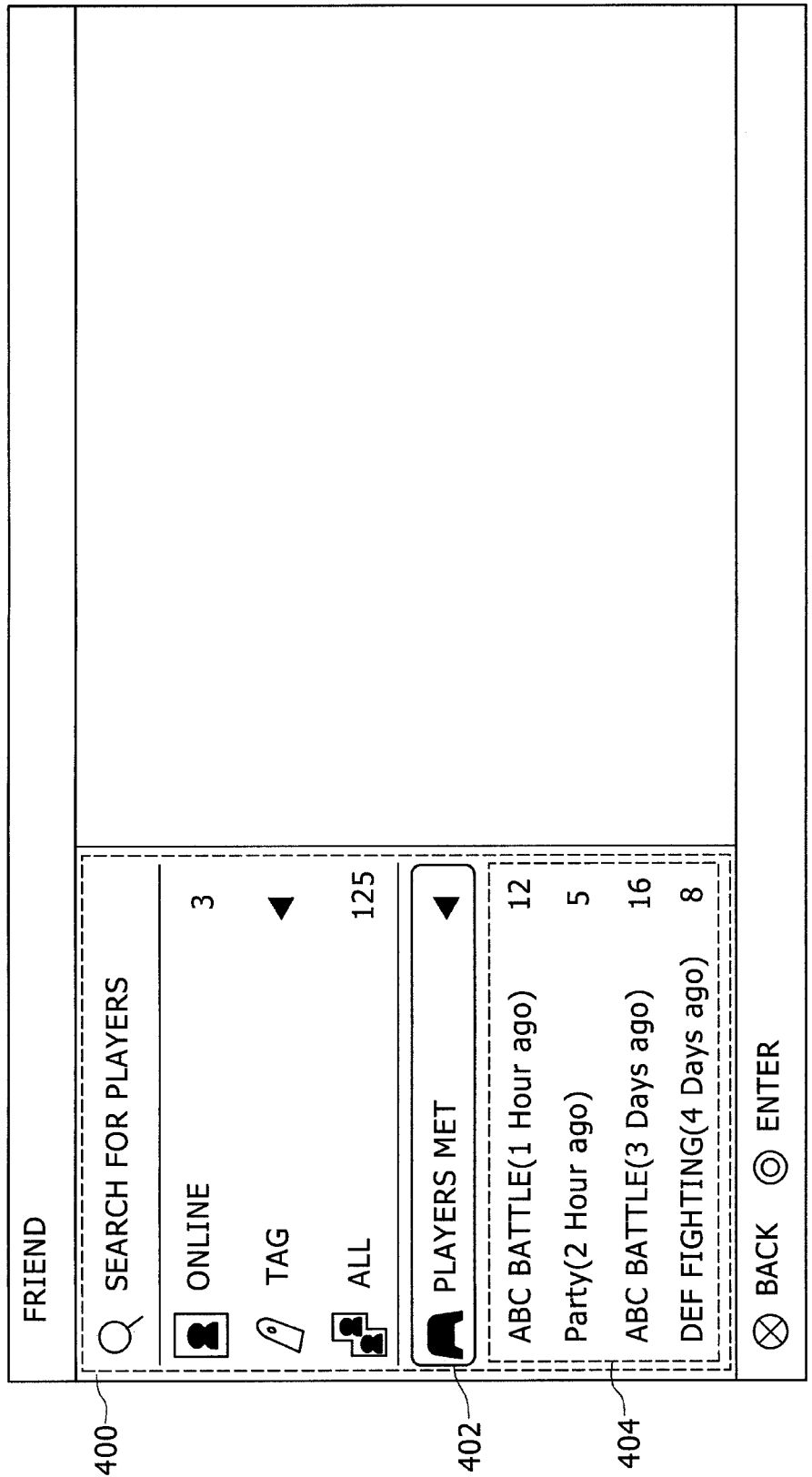
FIG. 8 is a schematic diagram showing another typical friend screen.

FIG. 8 shows another typical friend screen. The user A may place the focus frame 402 around the item "Players Met" by operating the input device 6. This causes the acquisition processing section 120 to acquire from the log server 17 at least the session IDs, application names, the number of users having participated in each application session, and the time difference of each session from the current time, the log server 17 holding the recorded data about the past application sessions in which the user A participated. The session list displaying section 142 displays information related to a plurality of past application sessions in which the user A participated, in a session list area 404 of the menu area 400. In terms of the information related to the application sessions, the session list displaying section 142 displays in list form the application names, the time differences of the sessions from the current time, and the number of users who participated in each session. Whereas the session list displaying section 142 in this embodiment displays in list form the information related to a plurality of past application sessions, the display may be made alternatively in some other suitable form.

On the friend screen shown in FIG. 8, the information regarding the past application sessions is displayed below the item "Players Met." In the session list area 404, the information about the more recent application sessions is displayed higher in the list, most recent at the top. The session list area 404 can accommodate information about only up to a predetermined number of sessions. The information related to the sessions exceeding the predetermined number is verified by the user A scrolling the session-related information across the session list area 404.

The session-related information arranged at the top of the session list area 404 is about the application named "ABC battle." The information shows that the user A ended the session one hour ago and that there were 12 participants in the session. The number of participants may be the number of users present when the user A ended the session. Alternatively, the number of participants may be the total number of users who participated in the session from the time the user A participated until the user ended the session. As another alternative, the number of participants may be the total number of users who participated in the session from beginning to end.

To display the number of participants present when the user A ended the session requires that the session information notifying section 114 notify the log server 17 of the information identifying the participating users at the end of the session and that the log server 17 record the information identifying the participating users as the recorded data regarding the user A. This allows the acquisition processing section 120 to acquire the number of participants at the end of the session from the log server 17. Also, to display the total number of participating users present from the time the user A participated in the session until the user A ended the session requires that the application executing section 112 record all users who participated in the session from the time the user A participated until the user A ended the session, that the session information notifying section 114 notify the log server 17 of the information identifying all participating users at the end of the session, and that the log server 17 record the information identifying the participating users as the recorded data about the user A. With the participating users recorded in this manner by the information processing apparatus 10, the log server 17 can record the information about the users who played with the user A and can transmit the information to the information processing apparatus 10 of the user A as the recorded data.

The session list displayed in the session list area 404 by the session list displaying section 142 enables the user A to verify at a glance the past application sessions in which the user A participated. The session list area 404 also displays the information about the differences in time of the sessions from the current time. The time difference information allows the user A to recognize when each session took place and thereby to remember whether the session was fun or boring, for example. The session list area 404 further displays the information about the users other than the friends, enabling the user to have the opportunity of gaining a new friend or friends.

When the user selects the information about an application session, the session list displaying section 142 displays the session-related information in a manner displaying detailed information about the selected application session. Specifically, with the information about a particular application session selected, the acquisition processing section 120 acquires accordingly the detailed information about the selected application session from the server 5. In this manner, with the session-related information selected, the session list displaying section 142 performs accordingly the process of acquiring the detailed information about the selected application session and displaying the detailed information thus obtained.

Figure 9:
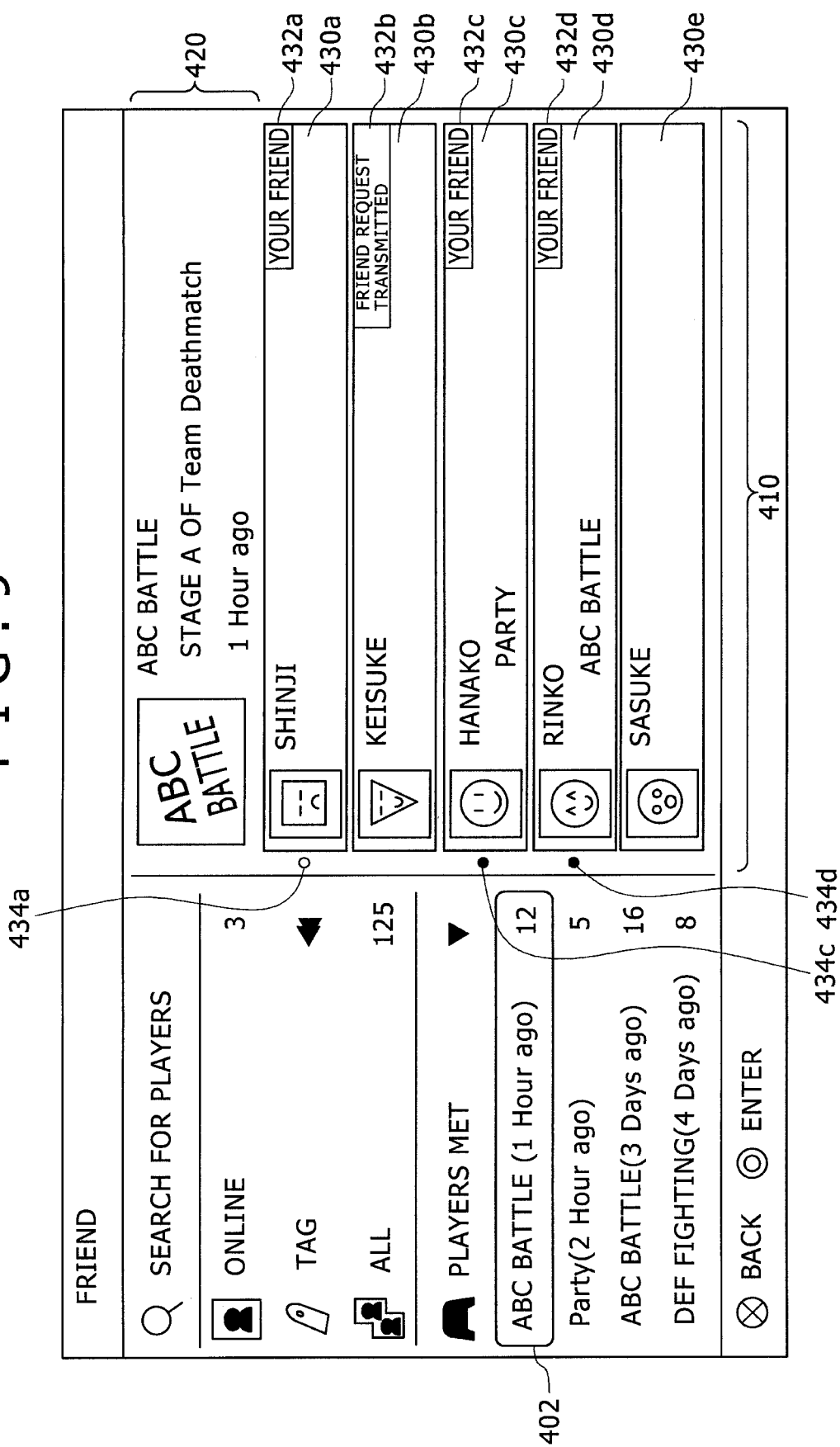
FIG. 9 is a schematic diagram showing still another typical friend screen.

FIG. 9 shows another typical friend screen. When the user A puts the focus frame 402 around the information related to a given session by operating the input device 6, the acquisition processing section 120 transmits to the log server 17 a request to acquire the detailed information including the session ID of the session-related information in the focused state. The log server 17 transmits to the information processing apparatus 10 the recorded data associated with the session ID included in the acquisition request.

The user list displaying section 144 displays session information in a session area 420, and also displays below the session area 420 the information identifying the users who participated in the application session. The session area 420 shows the icon image of the application, application name, session name, and information about the difference in time of the session from the current time. The acquisition processing section 120 may acquire the icon image from the management server 16, for example. Whereas the user list displaying section 144 in this embodiment displays in list form the information identifying a plurality of users having participated in the application session, the display may be made alternatively in some other suitable form.

The session name is a name given by the host user to the application session. In this example, a session name "Stage A of Team Deathmatch" is displayed. The session name allows the user A to uniquely recognize the session. This enables the user A, who may have participated in a plurality of sessions of the application "ABC battle" for example, to identify a given session on the basis of the time difference information and the session name. In this manner, verifying the time difference information and the session name unique to each session allows the user A to distinguish each of those multiple sessions of the same application in which the user A participated.

The user area 410 displays information related to five users 430a, 430b, 430c, 430d and 430e, from among 12 participating users. Each user-related information item is displayed in an area enclosed by an individual frame. As mentioned above, the user list displaying section 144 displays in the user area 410 the user-related information 430 not only about the friends but also about the users not registered as friends. The user-related information about the remaining users (7 users) is verified by scrolling the screen. Explained below is each of the individual user-related information items 430.

The user-related information 430a shows an online ID "SHINJI" supplemented with relationship information 432a indicating that this user is a friend. The relationship information 432a is arranged in the top right corner of the display area, indicating the relationship with the user A. The relationship information 432a is acquired by the acquisition processing section 120 from the network server 15 as status data indicating that this user is a friend. The user-related information 430a is also supplemented with an online mark 434a. The online mark 434a, which indicates whether this user is online or offline, is acquired from the network server 15 by the acquisition processing section 120. A while-circle online mark 434 indicates that this user is offline and a black-circuit online mark 434 shows that the user is online. The white-circle online mark 434a attached to SHINJI allows the user A to verify that SHINJI is currently offline. The online mark 434 is attached only if the user in question is a friend.

The user-related information 430b shows an online ID "KEISUKE" supplemented with relationship information 432b indicating that a friend request has been transmitted to this user. The relationship information 432b is acquired by the acquisition processing section 120 from the management server 16 as status data indicating that a friend request has been transmitted. In displaying the user-related information, the acquisition processing section 120 accesses various function servers in the server 5 to acquire status data indicative of the relationship with the user. Although the user A has transmitted a friend request to KEISUKE, KEISUKE has yet to be registered as a friend on the network server 15. Thus KEISUKE is not shown supplemented with the online mark 434.

The user-related information 430c shows an online ID "HANAKO" supplemented with relationship information 432c indicating that this user is a friend. The relationship information 432c is acquired as status data by the acquisition processing section 120 from the network server 15. The user-related information 430c is also supplemented with an online mark 434c. The online mark 434c as a black circle allows the user A to verify that HANAKO is currently online. The user-related information 430c also shows that HANAKO is participating in a party application. The name of the currently executing application is acquired from the presence server 18 by the acquisition processing section 120.

The user-related information 430d shows an online ID "RINKO" supplemented with relationship information 432d indicating that this user is a friend. The relationship information 432d is acquired as status data by the acquisition processing section 120 from the network server 15. The user-related information 430d is also supplemented with an online mark 434d. The online mark 434d as a black circle allows the user A to verify that RINKO is currently online. The user-related information 430d further shows that RINKO is playing the ABC battle game. The name of the currently executing application is acquired from the presence server 18 by the acquisition processing section 120.

The user-related information 430e shows an online ID "SASUKE." The user A is not friends with SASUKE and has not transmitted a friend request to this user. Thus on the information processing system 1, the user A has no point of contact with SASUKE. The only relationship with SASUKE was formed when the user A played the ABC battle game with this user one hour ago. However, the user list displaying section 144 displaying the user-related information 430e about SASUKE gives the user A the opportunity to again get in touch with SASUKE. Alternatively, the relationship between the user A and SASUKE may be displayed in the form of relationship information 432 indicative of the number of common friends between the two users.

The user list displaying section 144 displays in list form the user-related information 430 about the users having participated in past sessions as described above. This allows the user A to verify the members of a team who participated in a session at a given point in time (e.g., stage A of Team Deathmatch), and also gives the user A the opportunity to get in touch with the participating users by transmitting a friend request to some of them, for example. The user-related information 430, shown supplemented with the relationship information 432, enables the user A to verify at a glance the relationships with the participating users. At this point, some added relationship information (e.g., information 432b) allows the user A to check a future relationship with KEISUKE, for example.

Explained below is how a plurality of items of the user-related information 430 are arranged on the friend screen. In the user area 410 shown in FIG. 9, the multiple items of the user-related information 430 are arranged more or less at random. Alternatively, the user-related information 430 about a user registered as a friend may be positioned higher than the user-related information 430 about a user not registered as a friend. Of the friends, the users currently online may have their user-related information 430 positioned higher than the user-related information 430 about the users currently offline. Of the non-friends, the users having the relationship information 432 to be displayed may have their user-related information 430 positioned higher than the user-related information 430 about the users having no relationship information 432. This is how the user-related information 430 may be arranged in descending order of the user A's interest.

Figure 10:
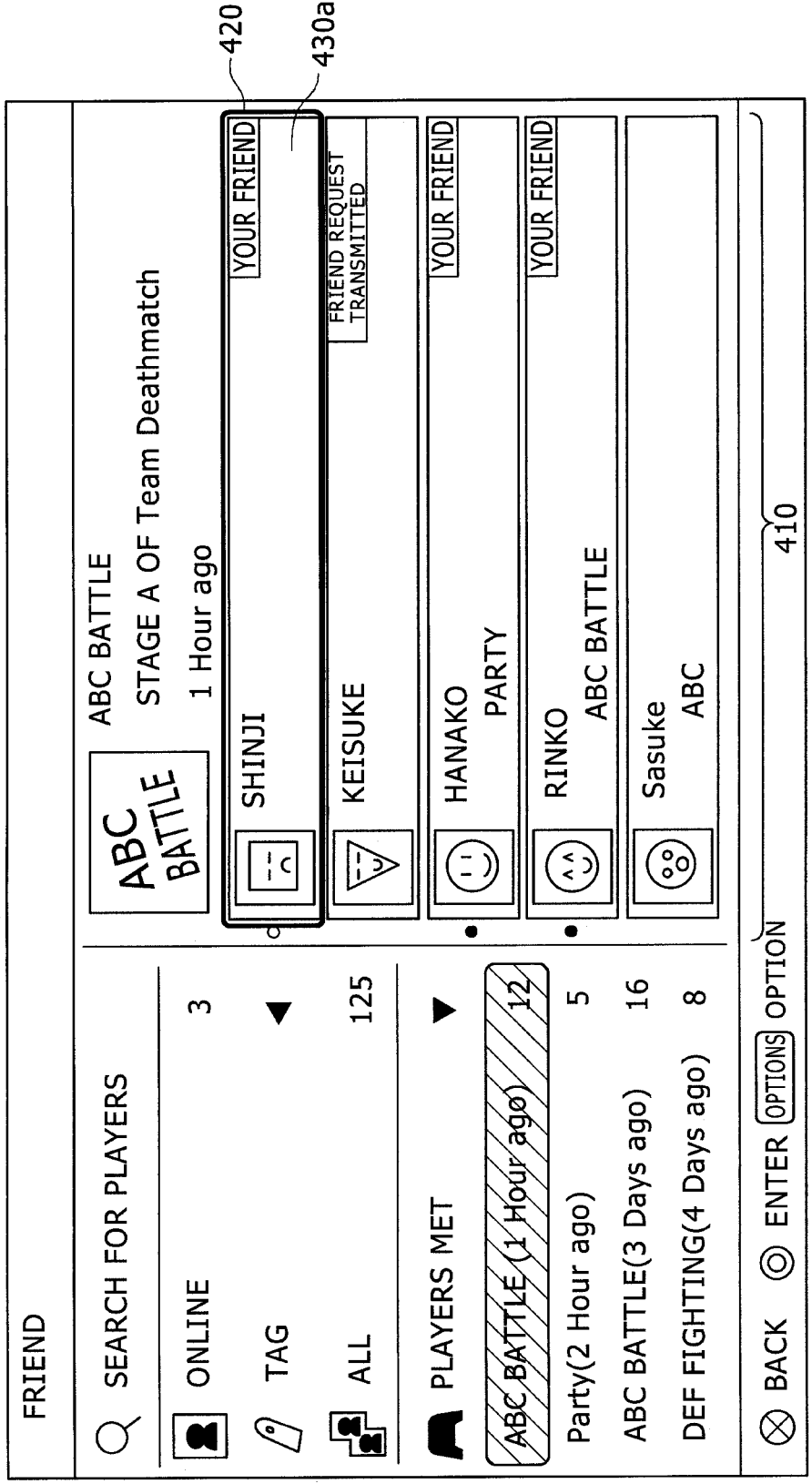
FIG. 10 is a schematic diagram showing still another typical friend screen.

FIG. 10 shows another typical friend screen. The user A puts the focus frame 402 around the display area of the user-related information 430*a* in the user area 410 by operating the input device 6. In this state, pressing by the user of an ENTER button on the input device 6 causes the profile displaying section 148 to generate a profile screen for SHINJI. This profile screen displays SHINJI's self-introductory statement and information about the trophies and friends gained by SHINJI, for example.

Figure 11:
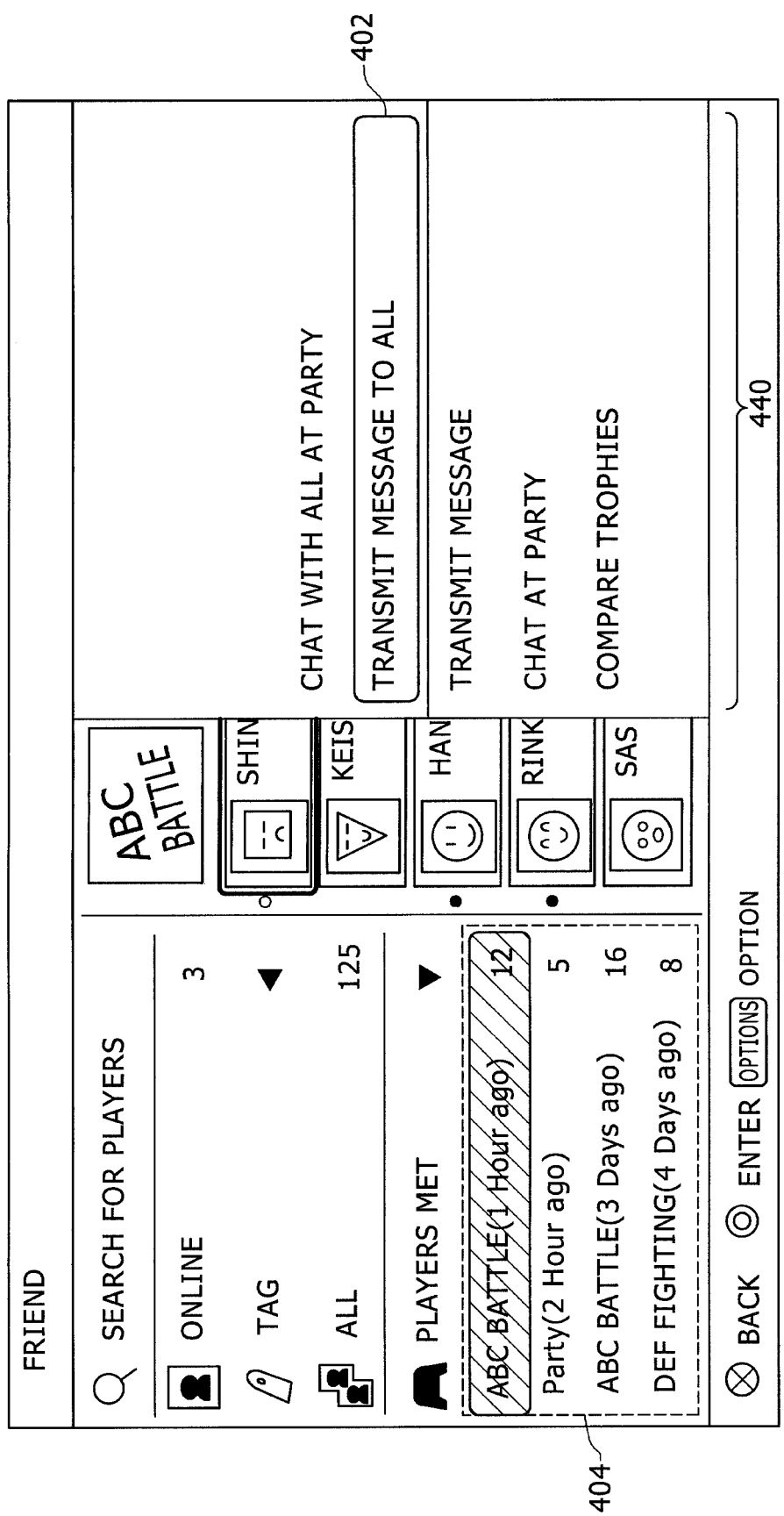
FIG. 11 is a schematic diagram showing still another typical friend screen.

FIG. 11 shows another typical friend screen. On the friend screen shown in FIG. 10, an operation by the user A of an OPTIONS button 82 on the input device 6 causes the menu displaying section 146 to display a menu area 440 showing menu items in a manner superimposed on the friend screen. In this example, five menu items are displayed.

An item "Transmit message to all" enclosed by the focus frame is intended for transmitting a message to all users who participated in an application. With one application session selected in the session list area 404, the user A may press the OPTIONS button 82 on the input device 6. This causes the menu displaying section 146 to generate the menu area 440 with menu items regarding the users having participated in the selected session. Also, with the focus frame 402 placed around the item "Transmit message to all," the user may operate the ENTER button on the input device 6. This causes the application executing section 112 to start a message application for transmitting a message to other users. The message application has the function of transmitting a message to all users having participated in a session. Selecting the item "Transmit message to all" causes the message application to acquire the network accounts of all participating users and transmit to the management server 16 a message addressed to the acquired network accounts. Upon receipt of the message, the message function of the management server 16 transmits the message to each of the participating users. The message may be prepared as desired by the user A. For example, the message may be an invitation saying, "Will you play the ABC battle game again with me?"

An item "Chat with all at party" is intended for transmitting a message to the members who participated in the party application, inviting them to join a party where the party application may be executed with a plurality of participating users. FIG. 11 shows that the user A executed the party application two hours ago. The user A may select the party in the session list area 404 and, with the focus frame 402 placed around the item "Chat with all at party," may operate the ENTER button on the input device 6. The operation causes the application executing section 112 to start the party application. After a plurality of users have participated in the party, the information processing apparatus 10 of a participating member may be arranged to start a predetermined application inviting the other members to a session of the started application.

As described, the information processing apparatus 10 in this embodiment handles as one group a plurality of users having participated in an application session, thereby transmitting a message simultaneously to all users in the group. This allows the user to get in touch with the like-minded users who gathered by chance as the members of the session. Following exchanges of the message, the members can regroup and again play the application together.

While the present invention has been described in conjunction with a specific embodiment given as an example, it should be understood by those skilled in the art that the above-described composing elements and various processes may be combined in diverse ways and that such combinations, variations and modifications also fall within the scope of this invention.

It was explained that the acquisition processing section 120 in the above embodiment acquires the recorded data about past application sessions from the server 5. Alternatively, the recorded data about past application sessions may be stored on the auxiliary storage device 2. This allows the acquisition processing section 120 to acquire the recorded data from the auxiliary storage device 2. In the above embodiment, the group, which will be set using an item "Tag" on the friend screen, is stored only on the auxiliary storage device 2 of the information processing apparatus 10. Alternatively, the information about groups may be transmitted from the information processing apparatus 10 to the server 5 on which the information may be recorded in association with the user A.

It was explained that the information processing apparatus 10 in the above embodiment has the function of displaying the friend screen as well as the function of executing games. However, the game executing function is not mandatory with the information processing apparatus 10. For example, the friend screen may be displayed on a mobile phone (e.g., smartphone) having no game executing function.

The item "Tag" on the friend screen is used by the user A to group other users. For example, upon encountering a highly skilled user in an ABC battle game session, the user A may set up a group named "experts of the ABC battle game" and register the encountered user in the group. The groups set by the item "Tag" are stored only on the information processing apparatus 10. The user A may transmit a message simultaneously to the members of a group set by the item "Tag."

It was explained that the session server in the above embodiment generates an application session by giving it a session ID and that the log server 17 holds the information about the users participating in the session as the recorded data associated with the session ID. For example, a plurality of teams may participate in a game session. In the session, the participating users are each assigned to a team. The information processing apparatus 10 or 14 of each user then causes the session information notifying section 114 to notify the log server 17 of session information including the information identifying the team to which the user belongs. This allows the log server 17 to hold as the recorded data the information identifying the team of each user. With the acquisition processing section 120 acquiring the recorded data through the friend screen shown in FIG. 9, the user list displaying section 144 may display such team information as part of the user-related information 430. The user list displaying section 144 may also display the team information about the user A in the session area 420.

In one variation of the above embodiment, the log server 17 may hold the recorded data not in association with the session IDs but in conjunction with other identification information. For example, if a plurality of teams battle against one another in a game session, each team may be assigned its identification information so that the log server 17 may hold the recorded data in connection with that identification information. In this manner, with one session divided, as it were, into a plurality of sessions, it is possible to accurately extract the users who played with the user A. This is a function that may be implemented by an application. In a game in which an X team and a Y team battle against each other for example, a user belonging to the X team may notify the log server 17 of identification information made of the session ID and information indicative of the X team, the identification information serving as a new session ID to be recorded on the log server 17. A user belonging to the Y team may also notify the log server 17 of identification information formed by the session ID and information indicative of the Y team, the identification information serving as another new session ID to be recorded on the log server 17. In this manner, the same session may be divided into a session for the X team and another session for the Y team, each of the sessions being managed as a separate session.

REFERENCE SIGNS LIST

1 . . . Information processing system, 6 . . . Input device, 10, 14 . . . Information processing apparatus, 15 . . . Network server, 16 . . . Management server, 17 . . . Log server, 18 . . . Presence server, 100 . . . Control portion, 102 . . . Communication processing portion, 110 . . . Operation receiving section, 112 . . . Application executing section, 114 . . . Session information notifying section, 116 . . . Presence information notifying section, 120 . . . Acquisition processing section, 122 . . . Display processing section, 130 . . . Screen generating unit, 132 . . . Home screen generating section, 134 . . . Function screen generating section, 140 . . . User screen generating block, 142 . . . Session list displaying section, 144 . . . User list displaying section, 146 . . . Menu displaying section, 148 . . . Profile displaying section

INDUSTRIAL APPLICABILITY

The present invention may be applied to the field of information processing technology.

The invention claimed is:

1. An information processing apparatus comprising:
an acquisition processing section configured to allow a user to select a past application session from a listing of a plurality of application session and acquire recorded data about the selected past application session,
wherein each past application session is a completed gaming application session that occurred at a passed date with a plurality of gaming participants; and
a screen generating unit configured to generate a screen related to the selected past application session on the basis of the acquired recorded data;
wherein the acquisition processing section acquires status data indicative of a relationship with the plurality of gaming participants, and
the screen generating unit displays information identifying the plurality of gaming participants together with a current online status of each of the plurality of gaming participants, a relationship status of each of the plurality of gaming participants, statistics related to the past application session, and an option to initiate a new gaming session with the plurality of gaming participants,
wherein the relationship status indicates if each of the plurality of gaming participants is registered as a friend or non-friend.

2. The information processing apparatus according to claim 1, wherein the screen generating unit displays information identifying the plurality of gaming participants in such a manner that the friends are displayed separately from the non-friends.

3. The information processing apparatus according to claim 1, wherein the acquisition processing section acquires the recorded data from a server connected to a network.

4. The information processing apparatus according to claim 1, wherein the user can use the screen to compose a message to the plurality of gaming participants from the selected past application session.

5. A non-transitory computer readable medium having stored thereon a program comprising:
by an acquisition section, acquiring a selection by a user of a past application session from a listing of a plurality of past application sessions and acquire recorded data about the selected past application session,
wherein each past application session is a completed gaming application session that occurred at a passed date with a plurality of gaming participants; and
by a screen generating unit, generating a screen related to the selected past application session on the basis of the acquired recorded data;
wherein the acquiring section acquires status data indicative of a relationship with the plurality of gaming participants, and
the screen generating unit displays information identifying the plurality of gaming participants together with a current online status of each of the plurality of gaming participants, a relationship status of each of the plurality of gaming participants, statistics related to the past application session, and an option to initiate a new gaming session with the plurality of gaming participants,
wherein the relationship status indicates if each of the plurality of gaming participants is registered as a friend or non-friend.

6. A screen generating method comprising:
acquiring, from a user, a selection of a past application session from a plurality of past application sessions;
acquiring recorded data about the selected past application session,
wherein each past application session is a completed gaming application session that occurred at a passed date with a plurality of gaming participants;
acquiring status data indicative of a relationship with the plurality of gaming participants; and
generating a screen related to the selected past application session on the basis of the acquired recorded data;
wherein the screen displays information identifying the plurality of gaming participants together with a current online status of each of the plurality of gaming participants, a relationship status of each of the plurality of gaming participants, statistics related to the past application session, and an option to initiate a new gaming session with the plurality of gaming participants,
wherein the relationship status indicates if each of the plurality of gaming participants is registered as a friend or non-friend.

* * * * *